J. KLOPFENSTEIN.
MACHINE FOR WORKING DIRT.
APPLICATION FILED JAN. 19, 1915.
1,168,813.
Patented Jan. 18, 1916.
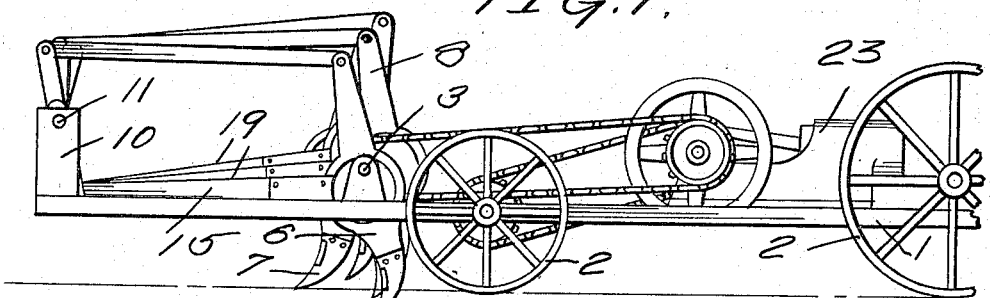
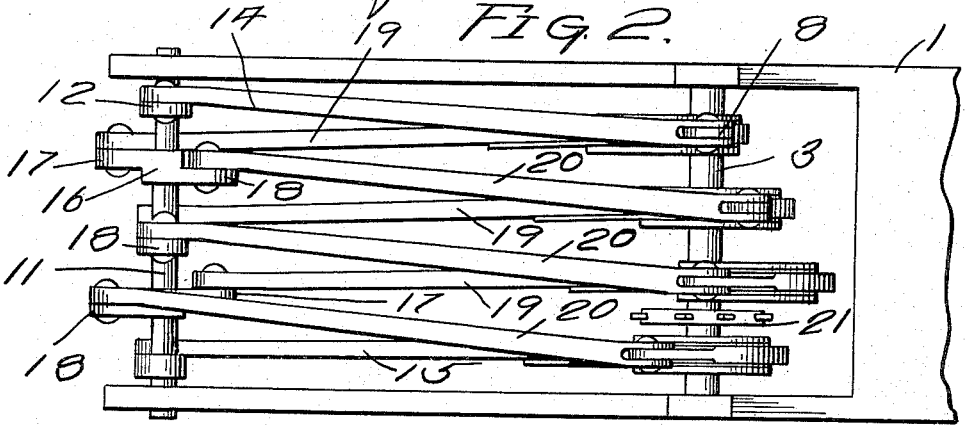
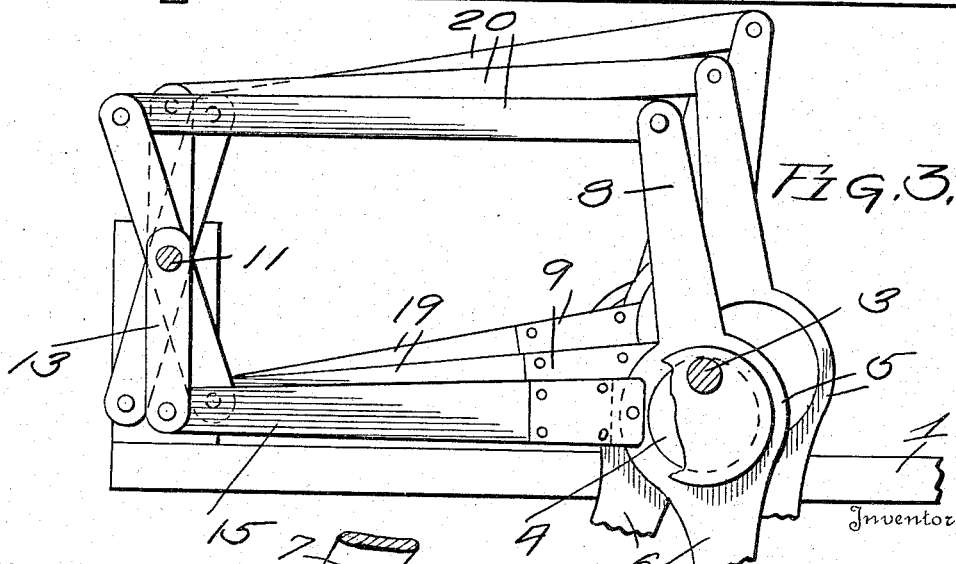

UNITED STATES PATENT OFFICE.

JOEL KLOPFENSTEIN, OF PREBLE, INDIANA.

MACHINE FOR WORKING DIRT.

1,168,813.  Specification of Letters Patent.  Patented Jan. 18, 1916.

Application filed January 19, 1915. Serial No. 3,129.

*To all whom it may concern:*

Be it known that I, JOEL KLOPFENSTEIN, a citizen of the United States, residing at Preble, in the county of Adams, State of Indiana, have invented certain new and useful Improvements in Machines for Working Dirt; and I do hereby declare the following to be a full, clear, and exact description of the invention, such as will enable others skilled in the art to which it appertains to make and use the same.

This invention relates to a machine for working dirt.

An object of the invention is to provide a machine by means of which dirt may be either plowed or cultivated.

A further object of the invention is to so construct the machine that it will be pushed forwardly by the digging action of the plows or cultivators.

A still further object is to so arrange the plows that a continual push will be applied to the frame of the machine.

With these and other objects in view, such as will appear as the description progresses, my invention comprises the combination and arrangement of parts as set forth in and falling within the scope of the appended claim.

Referring to the drawing: Figure 1 is a side elevation of my machine. Fig. 2 is a plan view thereof. Fig. 3 is a fragmental longitudinal sectional view: Fig. 4 is a fragmental detail.

Referring to the drawing wherein like parts are indicated by like characters throughout the several views: my device comprises a rectangular frame 1 supported on wheels 2. Extending transversely of the frame and rotatably mounted therein is a shaft 3. Secured to this shaft in spaced relation are a plurality of cams 4, which are shown in the drawings as four in number, but I wish it to be understood that I do not want to be limited to the use of four cams for it is obvious that the number may be increased as the occasion arises. The long axes of the alternate cams are parallel and extend in opposite directions and the said axes of the adjacent cams extending are at right angles to each other. Surrounding each of these cams is a cam strap 5 which has extending outwardly therefrom, an arm 6, to which is detachably secured the ground working implement 7, and I wish to here state that I may either secure plows or cultivator shovels, which may be of any desired construction, inasmuch as the particular construction forms no part of my invention.

On each of the straps 5 at a point diametrically opposite the arm 6 is a projection 8, while a similar projection 9 is pivoted on each strap and extends therefrom at right angles to the first mentioned projection.

Extending upwardly from the frame 1 are posts 10 between which are mounted a shaft 11, on which shaft are mounted on the ends thereof outwardly extending arms 12 and 13, the arm 12 at one end extending in a diametrically opposite direction to the arm 13 at the other end. Connected to the arm 12 is a rod 14 which extends rearwardly and is connected to the projection 8 on the adjacent strap 5, while the arm 13 has connected thereto a rod 15 which is extended rearwardly and connected to the projection 9 on the strap at the opposite end of the shaft 3 so that as the shaft 3 is rotated the motion of the strap 5 on the end cam 4 remote from the driving mechanism for the said shaft 3 will oscillate the shaft 11 and consequently control the strap 5 on the other end cam so that these straps and consequently the implements carried thereby will operate in a predetermined relation. In order that the remainder of the implements may likewise operate in a predetermined relation to each other and to the implements just described, I have loosely mounted on the shaft 11 a plurality of collars 16, on each of which are diametrically extended arms 17 and 18.

Connecting the projection 9 of one of the straps 5 and the arm 17 of the adjacent collar 16 is a rod 19, while connecting the projection 8 of the next adjacent strap and the arm 18 of the same collar is a rod 20. This connection between the collars and straps continues throughout the entire series so that the motions of the implements will be in predetermined relation.

In order that the motion may be imparted to the shaft 3, I have connected a drive wheel 21 on one end thereof, which wheel may be of any formation but which has preferably a chain connection to an engine 23 on the bed of the machine. This engine has also a chain connection to the rear wheels 2 so that they will be rotated to move the machine forwardly.

In operation, power is imparted to the shaft 3 and the implements mounted thereon actuated so that each implement moves downwardly into the ground thence backwardly and upwardly out of the ground and thereafter follows a path forwardly to its initial position, each successive implement penetrating the ground after the preceding implement has completed one-fourth of its revolution.

It is of course to be understood that the position of the cams 4 is changed when a greater or lesser number is used, the tools to be used being so arranged on the cams that a continuous motion will be imparted to the frame. Thus the ground will be either plowed or cultivated and at the same time the machine will be moved forwardly.

From the foregoing description it will be readily seen that I have provided a farming machine whereby the plows or cultivators which are attached thereto will not only operate upon the ground to perform their respective functions but will also advance the machine, and I have so constructed the machine that the implements will move in predetermined relations to each other, which relation will be maintained throughout the operation of the device.

While I have illustrated and described a particular embodiment of my invention, I have merely done so for the sake of convenience and I do not wish to be limited to that particular embodiment as it is obvious that numerous changes may be made in the details of construction thereof without in any way departing from the spirit of the invention or without exceeding the scope of the appended claim.

I claim:

In a dirt working machine, the combination with a frame having a shaft extending transversely thereof, of a plurality of cams mounted thereon, cam straps mounted on said cams and having downwardly extending implement carrying arms thereon and upwardly extending projections, a second shaft mounted on the frame and having collars loosely mounted thereon, the said collars having oppositely extending arms thereon, rods pivotally connected to said arms on each of said collars, one of said rods being connected to one of the aforementioned cam straps and the other of said rods being connected to the projection on the adjacent cam strap and means for rotating the first mentioned shaft.

In testimony whereof, I affix my signature, in the presence of two witnesses.

JOEL KLOPFENSTEIN.

Witnesses:
 TONK MEIBERS,
 JEFF KLOPPENSTEIN.

Copies of this patent may be obtained for five cents each, by addressing the "Commissioner of Patents, Washington, D. C."